3,377,138
HYDROCARBON REFORMING
William R. Gutmann and Richard A. Mascarich, Louisville, Ky., assignors to Catalysts and Chemicals, Inc., Louisville, Ky., a corporation of Delaware
No Drawing. Filed Jan. 7, 1966, Ser. No. 519,181
1 Claim. (Cl. 23—213)

This invention pertains to improvements in hydrogen production by the process involving steam-hydrocarbon reforming.

An object of this invention is to improve the methanation stages in hydrogen production.

Another object of the invention is to lengthen the life of the methanation catalyst under certain conditions of use.

Since methane leakage, that is, unreacted methane from a reformer, is controllable in a hydrogen plant by conditions in the reformer, the purity of the hydrogen gas stream is largely dependent upon treatment of the gas stream following the reformer. Steam and carbon dioxide can be readily removed. However, carbon monoxide, methane and inerts cannot be removed economically. Methane and inerts are not objectionable, but carbon monoxide is usually objectionable, because of its poisonous nature, in processes where the hydrogen is to be used. By-product treatment is chiefly concerned, therefore, with the carbon monoxide. The hydrogen gas stream from a reformer is passed through a carbon monoxide shift conversion stage to convert the carbon monoxide, insofar as possible, to carbon dioxide which can be removed by scrubbing. Residual carbon monoxide is converted to methane by catalytic reaction with hydrogen.

In steam-gas reforming two principal reactions are utilized. One is the reaction of a hydrocarbon such as methane with steam according to the following equation:

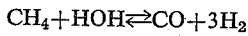

$$CH_4 + HOH \rightleftarrows CO + 3H_2$$

This reaction is highly endothermic. Hence it requires a large heat input. It is generally, therefore, conducted in a reforming furnace. It can be seen that the products from this reforming reaction are hydrogen and carbon monoxide. A shift reaction also occurs simultaneously during reforming. This reaction proceeds according to the following:

$$CO + HOH \rightleftarrows CO_2 + H_2$$

The products from the steam-gas reformer are next treated to convert carbon monoxide to carbon dioxide. This convertion is accomplished in a shift converter wherein the shift reaction described is brought about. Carbon monoxide is shifted to carbon dioxide because carbon dioxide can be more readily removed from the system. This removal is generally accomplished in a carbon dioxide adsorber through the use of a liquid absorbent. After the absorption of carbon dioxide any remaining carbon dioxide and residual carbon monoxide are converted to methane by reaction with hydrogen in a methanator.

This invention is concerned with by-product treatment, that is, with carbon dioxide removal and methanation stages. The invention will be better understood after a more complete explanation of the steam-gas reforming process.

A hydrocarbon such as methane is passed through a bed of a suitable adsorbent such as activated carbon or a metal oxide, or through a suitable absorbent such as potassium permanganate or a sodium carbonate solution to free it of sulfur compounds. The desulfurized hydrocarbon gas is then conducted to a reforming furnace containing tubes filled with a conventional reforming catalyst. The reforming furnace is operated so that the reforming temperature, inside tube temperature, is 1200° F. to 1700° F. Steam is employed, generally in a volumetric ratio of about 1 to 4 volumes of steam to 1 volume per carbon atom in the hydrocarbon. The reforming operation is conducted at a superatmospheric level of about 15 to 300 p.s.i.g., preferably 50 to 100 p.s.i.g. Specific reforming catalysts are any of the well-known types from Groups VI and VIII of the Periodic Table such as iron, nickel or cobalt oxides. The relative quantities of reactant and catalysts is determined on a volumetric space velocity which is generally in the range of about 500 to 3,000 volumes of gas per hour per volume of catalyst.

The reformed product contains appreciable quantities of carbon monoxide which can be used to produce additional quantities of hydrogen by means of the water gas shift reaction. For this purpose the reformer effluent is cooled and enters a shift converter at a temperature of 800° F. or below depending upon whether a high temperature shift catalyst, operating at 600° F. to 800° F. is employed, or whether a low temperature shift catalyst is used permitting operation at 300° F. to 600° F. A low temperature shift catalyst is described in Ser. No. 330,542. When either high or low temperature shift catalysts are employed, the volumetric steam-gas ratio will range from about 0.2 to 3 volumes of steam per volume of gas.

After conversion of carbon monoxide to carbon dioxide in the shift converter the carbon dioxide is generally removed by absorption using a solution which can be regenerated. In most hydrogen streams residual methane can be tolerated, whereas carbon monoxide cannot be. Accordingly it is the practice to hydrogenate carbon monoxide, along with any carbon dioxide which is not removed in the carbon dioxide absorber. The hydrogenation of these two carbon oxides is called methanation since methane and steam are the resulting products. Methanation catalysts generally employed are nickel catalysts, the reaction being carried out at a temperature of 300° F. to 750° F. Generally the reaction is conducted using 3 mols of hydrogen per mol of carbon monoxide and 4 mols of hydrogen per mol of carbon dioxide. The space velocities (s.c.f.h. of gas per cu. ft. of catalyst) range from 1,000 to 20,000. A particularly desirable methanation catalyst consists of 45 to 70 weight percent of nickel oxide on a refractory support composed largely of alumina.

A carbon dioxide absorbing system which is very desirable because it can be matched to the steam requirement of the system involves the use as an absorbent of a solution of thiocyclopentane 1-dioxide. Thiocyclopentane 1-dioxide normally called Sulfolane is a highly polar compound of outstanding solvent properties and chemical thermal stability. It is miscible with water and is a good solvent for most classes of organic compounds and many common polymers. Sulfolane is also called tetramethylene sulfone and has a molecular weight of 120.17, a boiling point of 285° C. and a freezing point of 27.4° C. When used as a carbon dioxide absorbent solution Sulfolane is generally mixed with an amino compound. An absorbent solution frequently employed contains about 40% Sulfolane, 45% diisopropanolamine and 15% water. Amines such as monoethanolamine and diethanolamine, and hot potassium carbonate solutions are both employed commercially. However Sulfolane solutions are preferred and are extensively used because they require much less regeneration energy than the others, steam generally being used. While Sulfolane solutions are widely employed they have the disadvantage that the active life of the nickel methanation catalyst is shortened by their use. Even in view of the thermal stability of Sulfolane, the absorbent solution nevertheless has a vapor pressure. Consequently small concentrations of Sulfolane escape the absorbing or scrubbing tower with the carbon monoxide feed gas to the methanator.

By the practice of this invention it has been found that whereas Sulfolane would not be harmful if it passed through the methanator as such, it decomposes under usual methanation conditions to form sulfur compounds which do poison the nickel catalyst. One of the difficulties presented by the problem is that substances usually employed for the removal of sulfur compounds do not remove Sulfolane. It acts as a cumulative poison on nickel methanation catalysts, and values as low as 0.1 part per million (p.p.m.) have been found to shorten the catalyst life from over five years to less than one year. In accordance with this invention it has been found that activated carbon employed between the carbon dioxide scrubber and the methanator protects methanation catalysts, extending their lives to a normal value. It is realized that known adsorbents do not remove all forms of sulfur. Zinc and other oxides, for example, do not function effectively herein.

The invention can perhaps be better illustrated by reference to specific examples and data. Various adsorbents have been evaluated in operation in drums in series with Sulfolane scrubbers and between such scrubbers and methanation towers. The following shows the effect on a methanation catalyst of Sulfanol, a commercial Sulfolane composition. The catalyst was a high surface area alumina carrier having about 30 percent nickel deposited thereon. Both activated carbon and zinc oxide were used as methanation catalyst guards. A desirable means of expressing the activity of the methanation catalyst is based on space velocity (SV) on a dry basis.

$$K = (SV) \log \frac{CO\ in}{CO\ out}$$

While the expression may be purely mathematical, it has been found to be a reliable means of expressing the catalyst activity in both bench scale and commercial units. The following data resulted from a volume of 1.5 million standard cubic feet of carbon dioxide effluent stream per cubic foot of methanation catalyst containing about 1 percent CO at a space velocity of 3,000, the methanation temperature being 500° F. The quantity of sulfolane in the gas stream was periodically increased and the percent sulfur on the catalyst was calculated from the sulfur analysis of the methanation inlet stream. The data shows the effect of both zinc and activated carbon on the activity of the methanation catalyst.

TABLE

| Percent Sulfur on Cat. | Methanation Catalyst Activity | | |
|---|---|---|---|
| | No Adsorber | Zn Adsorber | C Adsorber |
| 0.05 | 30,000 | 30,000 | 30,000 |
| 0.1 | 20,000 | 28,000 | 30,000 |
| 0.2 | 10,000 | 24,000 | 30,000 |
| 0.3 | 5,500 | 20,000 | 30,000 |
| 0.4 | 4,000 | 17,000 | 30,000 |
| 0.5 | 2,800 | 14,000 | 30,000 |
| 0.6 | 1,200 | 10,000 | 30,000 |
| 0.7 | 1,100 | 7,000 | 30,000 |
| 0.8 | 1,000 | 3,500 | 30,000 |
| 1.0 | 1,000 | 1,000 | 30,000 |
| 2.0 | 1,000 | 1,000 | 30,000 |
| 3.0 | 1,000 | 1,000 | 30,000 |

It can be seen that sulfur adsorbers such as zinc oxide have a very poor capacity for removal herein whereas the activated carbons have a very high capacity. The activity of the methanation catalyst declined very sharply in the case of zinc oxide, with no decline at all in the case of carbon. It is understood, of course, that the activated carbon employed can be chemically treated with metal oxides and the like. These and other modifications and ramifications will occur to those skilled in the art. Such variations are deemed to be within the scope of this invention.

What is claimed is:

1. In the process for the production of hydrogen wherein a desulfurized hydrocarbon vapor stream is reformed by reaction with steam at a temperature above 1200° F. in the presence of a reforming catalyst to convert hydrocarbon to carbon monoxide, carbon dioxide and hydrogen; wherein the reformed stream is cooled and subjected to a water gas shift conversion involving the reaction between carbon monoxide in said stream and steam at a temperature below 850° F. in the presence of a shift catalyst to convert carbon monoxide to carbon dioxide; wherein the carbon dioxide in the reaction product is removed by absorption using a liquid absorbent, and wherein carbon oxides remaining in said stream after carbon dioxide absorption are hydrogenated to convert the carbon oxides to methane; the steps of absorbing the carbon dioxide from the shifted gas stream in a thiocyclopentane 1-dioxide solution and subsequent to the said step passing the stream through a bed of activated carbon to remove thiocyclopentane 1-dioxide carried over with the stream to be methanated and thereby protecting said catalyst from decomposition products thereof formed under methanation conditions.

References Cited

UNITED STATES PATENTS 2,759,799  8/1956  Berg _____ 23—213
3,039,251  6/1962  Kamlet _____ 55—29
3,251,652  5/1966  Pfefferle _____ 23—150 XR OSCAR R. VERTIZ, *Primary Examiner.*

EDWARD STERN, *Examiner.*